(12) United States Patent
Antchak et al.

(10) Patent No.: US 8,789,670 B2
(45) Date of Patent: Jul. 29, 2014

(54) DECOUPLER FEATURING HELICAL WRAP CLUTCH SPRING AND COIL DAMPER SPRINGS

(75) Inventors: John R. Antchak, Aurora (CA); James W. Dell, Newmarket (CA); Harvey J. Dix, Thornton, CA (US); Scott Parsons, Toronto (CA)

(73) Assignee: Litens Automotive Partnership, Woodbridge (CA)

( * ) Notice: Subject to any disclaimer, the term of this patent is extended or adjusted under 35 U.S.C. 154(b) by 368 days.

(21) Appl. No.: 13/254,372

(22) PCT Filed: Mar. 1, 2010

(86) PCT No.: PCT/CA2010/000296
§ 371 (c)(1),
(2), (4) Date: Sep. 1, 2011

(87) PCT Pub. No.: WO2010/099605
PCT Pub. Date: Sep. 10, 2010

(65) Prior Publication Data
US 2011/0315502 A1  Dec. 29, 2011

Related U.S. Application Data

(60) Provisional application No. 61/156,907, filed on Mar. 3, 2009.

(51) Int. Cl.
*F16D 3/66* (2006.01)
*F16D 41/20* (2006.01)

(52) U.S. Cl.
CPC *F16D 41/20* (2013.01); *F16D 3/66* (2013.01); *F16D 41/206* (2013.01)
USPC ...... 192/41 S; 192/212; 192/55.61; 464/67.1; 474/94

(58) Field of Classification Search
CPC ......... F16D 13/08; F16D 41/00; F16D 41/06; F16D 2041/0605; F16D 41/20; F16D 41/206; F16D 13/01; F16D 13/12; F16D 13/14; F16D 13/16; F16D 3/66
USPC .................................... 192/41 S, 158
See application file for complete search history.

(56) References Cited

U.S. PATENT DOCUMENTS 4,777,843 A * 10/1988 Bopp ........................ 464/68.3
5,065,642 A    11/1991 Kagiyama et al.
(Continued)

FOREIGN PATENT DOCUMENTS

DE   102007047393 A1   4/2008
DE   102007047394 A1   4/2008
(Continued)

OTHER PUBLICATIONS

International Search Report and Written Opinion of the International Searching Authority for PCT/CA2010/000296, mailed Jun. 16, 2010; ISA/CA.

*Primary Examiner* — Edwin A Young
*Assistant Examiner* — Colby M Hansen
(74) *Attorney, Agent, or Firm* — Harness, Dickey & Pierce, P.L.C.

(57) ABSTRACT

A decoupler having a hub, a drive member and an isolator. The drive member is disposed about the hub for rotation about a rotational axis and includes an inner clutch surface. The isolator couples the hub and the drive member and includes a carrier, a plurality of arcuate springs, and a wrap spring. The carrier is received between the hub and the drive member and includes a carrier member, which defines a pair of apertures, and a pair of reaction blocks that are mounted in the apertures. The arcuate springs are mounted in the carrier member and are disposed between the hub and an associated one of the reaction blocks. The wrap spring has an end and a plurality of helical coils that are engaged to the inner clutch surface of the drive member. The end has an end face that is abutted against one of the reaction blocks.

21 Claims, 18 Drawing Sheets

(56) References Cited

U.S. PATENT DOCUMENTS

| | | |
|---|---|---|
| 5,139,463 A | 8/1992 | Bytzek et al. |
| 5,156,573 A | 10/1992 | Bytzek et al. |
| 5,722,909 A | 3/1998 | Thomey |
| 6,044,943 A | 4/2000 | Bytzek et al. |
| 6,083,130 A | 7/2000 | Mevissen et al. |
| 6,394,248 B1 | 5/2002 | Monahan et al. |
| 7,070,033 B2 | 7/2006 | Jansen et al. |
| 7,153,227 B2 | 12/2006 | Dell et al. |
| 7,207,910 B2 | 4/2007 | Dell et al. |
| 7,275,630 B2 | 10/2007 | Jansen et al. |
| 7,591,357 B2 | 9/2009 | Antchak et al. |
| 7,618,337 B2 | 11/2009 | Jansen et al. |
| 7,624,852 B2 | 12/2009 | Mevissen et al. |
| 7,712,592 B2 | 5/2010 | Jansen et al. |
| 7,766,774 B2 | 8/2010 | Antchak et al. |
| 2009/0176583 A1 | 7/2009 | Dell et al. |
| 2009/0176608 A1 | 7/2009 | Jansen et al. |
| 2010/0032258 A1 | 2/2010 | Mevissen et al. |
| 2010/0101909 A1 | 4/2010 | Dell et al. |

FOREIGN PATENT DOCUMENTS

| | | |
|---|---|---|
| WO | WO-9612122 A1 | 4/1996 |
| WO | WO-03104673 A1 | 12/2003 |
| WO | WO-2004070225 A1 | 8/2004 |
| WO | WO-2005028899 A1 | 3/2005 |
| WO | WO-2010048732 A1 | 5/2010 |
| WO | WO-2011072391 A1 | 6/2011 |

\* cited by examiner

DECOUPLER FEATURING HELICAL WRAP CLUTCH SPRING AND COIL DAMPER SPRINGS

CROSS-REFERENCE TO RELATED APPLICATIONS

This application is a 371 U.S. National Stage of International Application No. PCT/CA2010/000296, filed on Mar. 1, 2010, and published in English as WO 2010/099605 A1 on Sep. 10, 2010. The application claims the benefit of U.S. Provisional Patent Application No. 61/156,907, filed on Mar. 3, 2009. The contents of both are incorporated herein by reference in their entirety.

INTRODUCTION

The present disclosure generally relates to a decoupler.

Examples of known decouplers are described in WIPO Publication Nos. WO 2004/070225 and WO 2005/028899. While such decouplers are satisfactory for their intended use, such decouplers are nonetheless susceptible to improvement.

SUMMARY

This section provides a general summary of the disclosure, and is not a comprehensive disclosure of its full scope or all of its features.

In one form, the present teachings provide a decoupler having a hub, a drive member and an isolator. The hub has a rotational axis. The drive member, which is disposed about the hub for rotation about the rotational axis, includes an inner clutch surface. The isolator couples the hub and the drive member. The isolator includes a carrier, a plurality of arcuate springs, and a wrap spring. The carrier is received between the hub and the drive member. The carrier includes a carrier member and a pair of reaction blocks. The carrier member defines a pair of apertures into which the reaction blocks are mounted. Each of the arcuate springs is mounted in the carrier member and is disposed between the hub and an associated one of the reaction blocks. The wrap spring has a proximal end and a plurality of helical coils. The proximal end has an end face that is abutted against one of the reaction blocks. The helical coils are engaged to the inner clutch surface of the drive member.

In another form, the present teachings provide:
a) a decoupler having a isolator that includes a carrier that is at least partly formed of sheet metal;
b) a decoupler having a bumper that includes at least two of the following features: i) an axial thrust surface for a hub tab; ii) an axial thrust surface for limiting tipping of a carrier relative to a drive member; iii) a spring abutment; and iv) a bumper that is contacted by the hub tab when no load is transmitted to the hub.
c) a decoupler that employs a coating between a carrier and a pair of arcuate springs to reduce wear and friction;
d) a method for forming a decoupler in which a carrier member and a hub (or a carrier and a hub) are heat treated together as a pair before a pair of reaction blocks are mounted to the carrier member;
e) a method for forming a decoupler in which a hub is formed in pieces and is assembled to a carrier having a carrier member and a pair of reaction blocks after the reaction blocks have been permanently affixed to the carrier member; and
f) a decoupler that employs a carrier with a carrier member and reaction blocks, wherein at least one of the carrier member and the reaction blocks have a surface that is configured to center the carrier relative to wrap spring.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. Similar or identical elements are given consistent identifying numerals throughout the various figures.

Corresponding reference numerals indicate corresponding parts throughout the several views of the drawings.

DETAILED DESCRIPTION OF THE VARIOUS EMBODIMENTS

Example embodiments will now be described more fully with reference to the accompanying drawings.

Figure 1:
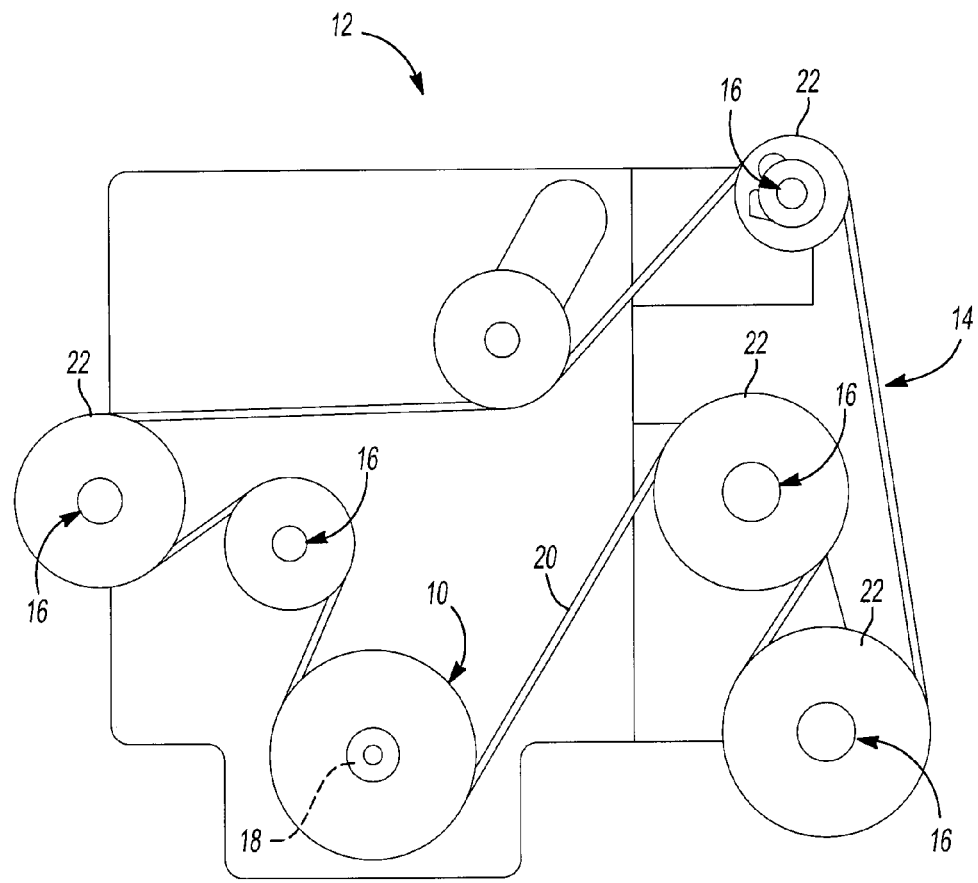
FIG. 1 is a schematic illustration of a decoupler constructed in accordance with the teachings of the present disclosure in operative association with an exemplary engine.

With reference to FIG. 1 of the drawings, a decoupler constructed in accordance with the teachings of the present disclosure is generally indicated by reference numeral 10. The decoupler 10 is shown in operative association with an automotive engine 12 that can include an accessory drive 14 having a plurality of engine accessories 16. In the particular example provided, the decoupler 10 is coupled to an output member (e.g., crankshaft) 18 of the engine 12 and transmits rotary power via an endless power transmitting element 20, such as a belt or a chain, to input members, such as pulleys or sprockets, to drive the engine accessories 16. It should be appreciated that while the decoupler 10 is illustrated in association with a front engine accessory drive, a decoupler constructed in accordance with the teachings of the present disclosure may be incorporated into various other devices in which a driven load is able at times to overspeed a source of rotary power.

Figure 2:
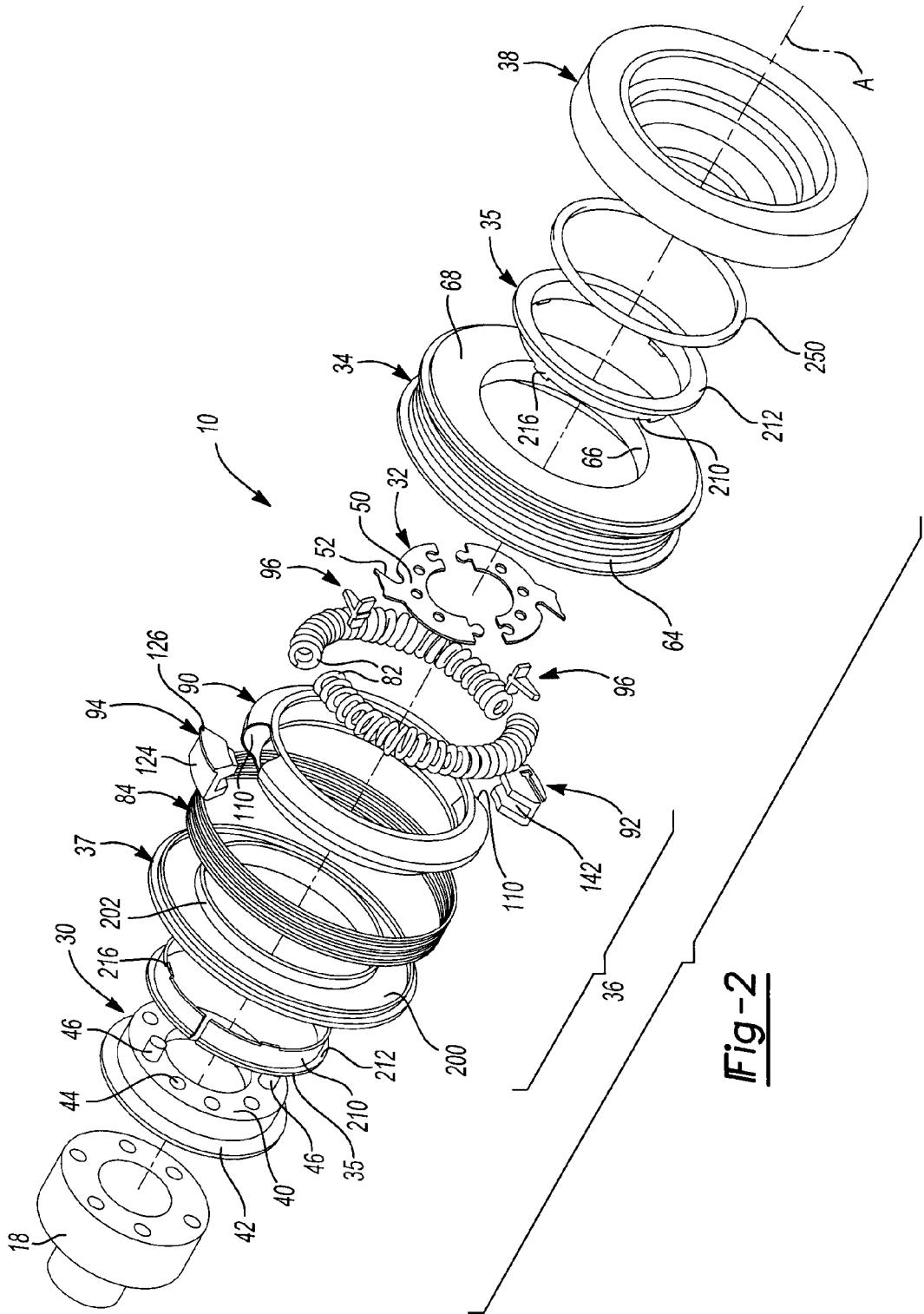
FIG. 2 is a front exploded perspective view of the decoupler of FIG. 1.
Figure 3:
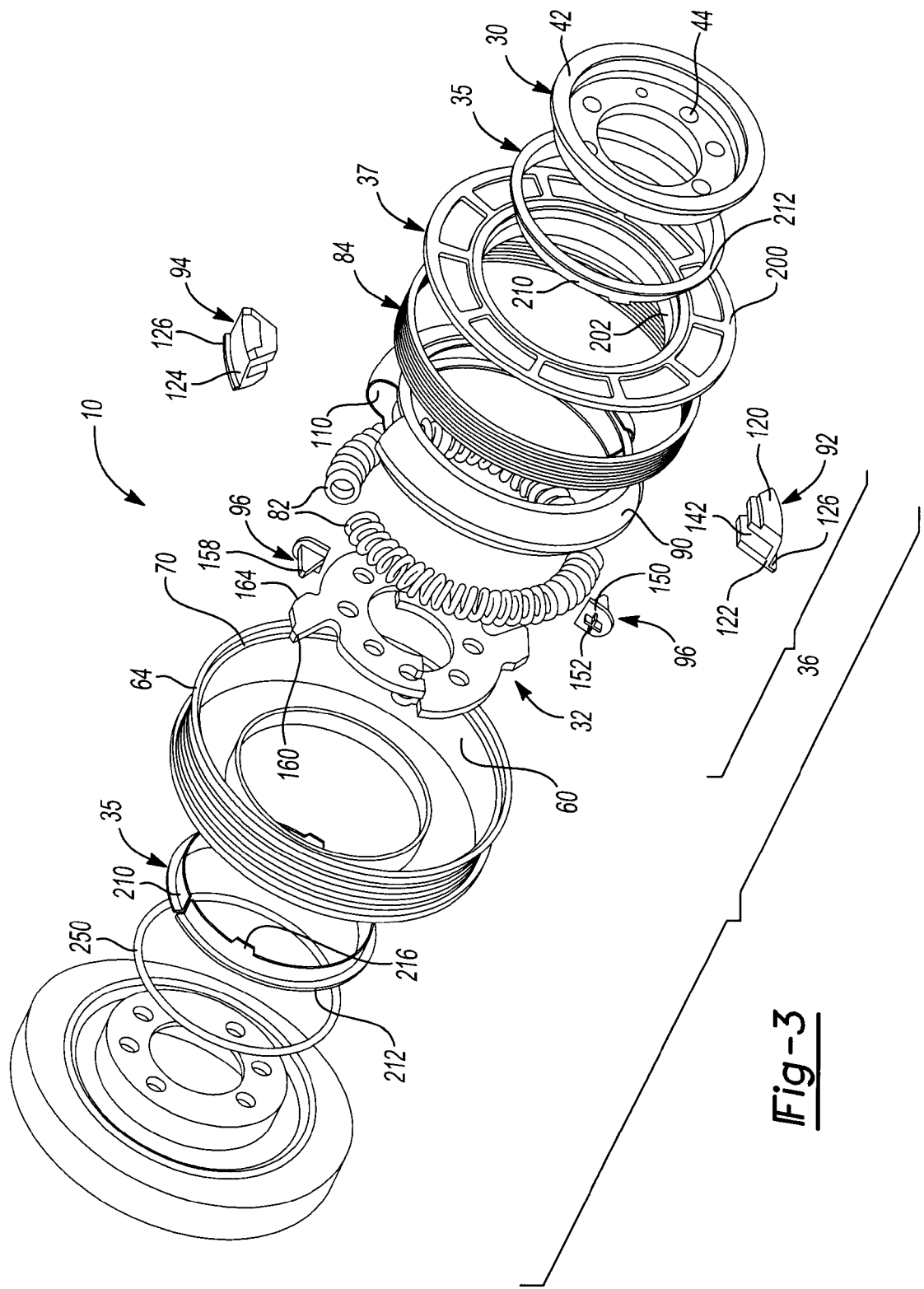
FIG. 3 is a rear exploded perspective view of the decoupler of FIG. 1.

With reference to FIGS. 2 and 3, the decoupler 10 can be rotatable about an axis A and can include a hub spacer 30, a hub 32, a drive member 34, a pair of bushings 35, a isolator 36, a cover 37 and a torsional vibration damper 38.

The hub spacer 30 can be abutted against an axial end of the crankshaft 18 and may be employed, if needed, to obtain a desired axial spacing between the crankshaft 18 and the hub 32. The hub spacer 30 can include an annular spacer body 40 and an annular spacer flange 42 that can extend radially outwardly from the spacer body 40. One or more bolt holes 44 can be formed through the spacer body 40 and if desired, one or more keying features, such as dowel pins 46, may be coupled to, formed in or formed by the spacer body 40 that can be employed to maintain a predetermined rotational orientation of the hub spacer 30 relative to the hub 32, the torsional vibration damper 38 and/or the crankshaft 18. In the particular example provided, the dowel pins 46 engage corresponding holes in the hub 32 and the torsional vibration damper 38. The dowel pins 46 can be staked after assembly to provide a means to secure the assembly prior to installation of the decoupler 10 to the engine 12 (FIG. 1).

Figure 5:
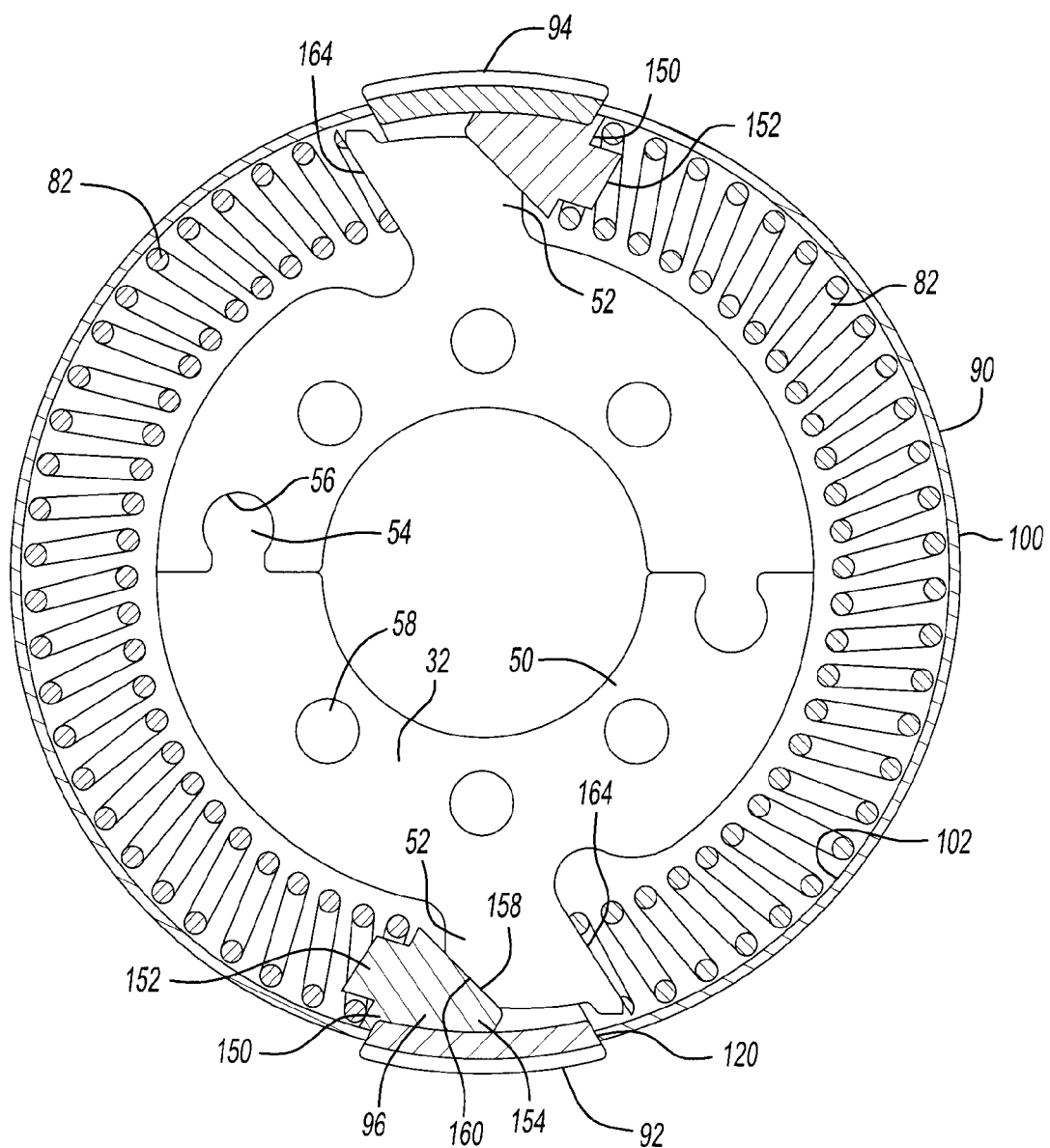
FIG. 5 is a section view of a portion of the isolator of FIG. 4.

The hub 32 can comprise an annular hub body 50 and a pair of hub tabs 52 that can extend radially outwardly from the hub body 50. As best shown in FIGS. 3 and 5, the hub 32 can be formed by two identical components, each of which is formed of steel plate and comprises a locking tab 54 and a locking slot 56 that is complementary to the locking tab on the other hub plate component. Construction of the hub 32 in multiple pieces can facilitate the installation of the hub 32 into portions of the isolator 36 as will be described in more detail, below. It will be appreciated, however, that the hub 32 could be unitarily formed. A plurality of holes 58 can be formed through the hub body 50 in a pattern that mimics that of the holes 44 in the spacer body 40.

Returning to FIGS. 2 and 3, the drive member 34 is configured to receive rotary power through the hub 32 and the isolator 36 and can comprise a clutch surface 60 that can be drivingly engaged by the isolator 36 to transmit rotary power therebetween. The clutch surface 60 may be heat treated and/or coated as desired. In the particular example provided, the clutch surface is hardened and nitrided. The drive member 34 can comprise a circumferentially extending outer wall 64, a circumferentially extending inner wall 66, and an annular front wall 68 that can interconnect the outer and inner walls 64 and 66. The clutch surface 60 can be defined by an inside circumferentially extending surface of the outer wall 64, while an outside circumferentially extending surface of the outer wall 64 can be configured to engage the endless power transmitting element 20 (FIG. 1). In the example provided, the outside surface of the outer wall 64 is configured to engage a poly-V drive belt. A counterbore 70 can be formed into the outer wall 64 on a side opposite the front wall 68. The inner wall 66 can be concentric with the outer wall 64, but can extend axially rearward from the front wall 68 so as to be relatively shorter in the axial direction than the outer wall 64.

Figure 4:
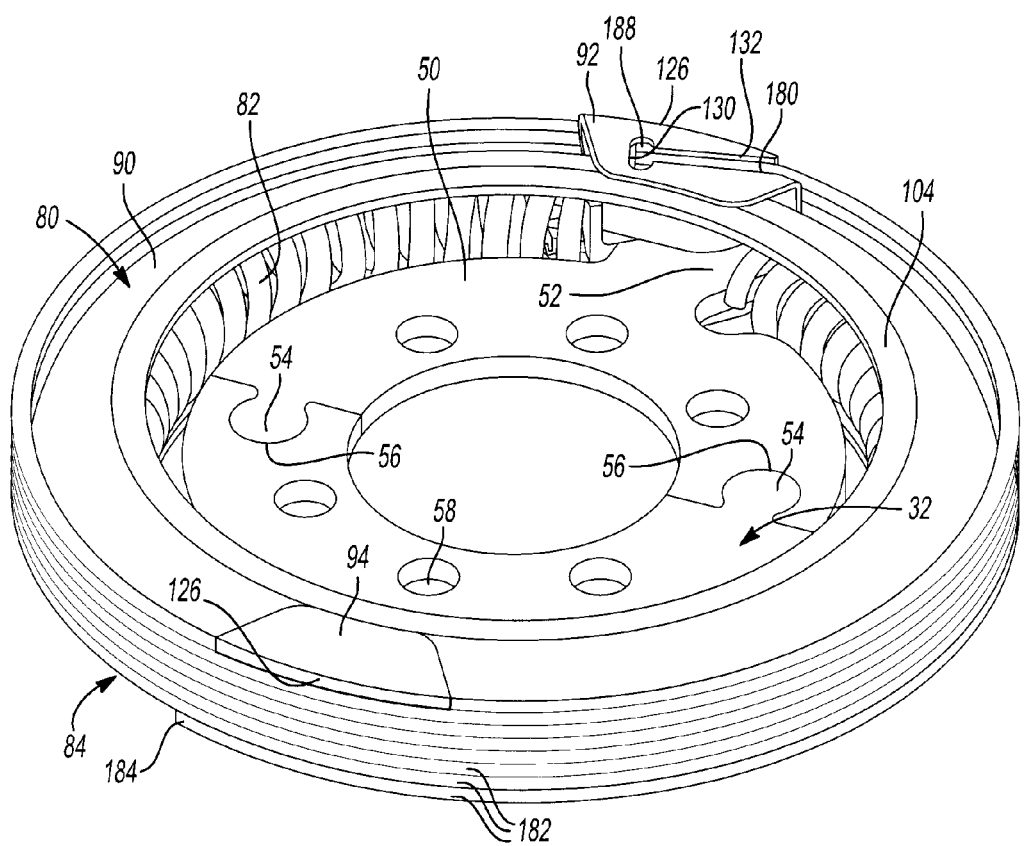
FIG. 4 is a perspective view of a portion of the decoupler of FIG. 1 illustrating the isolator in more detail.

With reference to FIGS. 3 through 5, the isolator 36 can comprise a carrier 80, a plurality of arcuate springs 82, and a wrap spring 84. The carrier 80 can comprise a carrier member 90, a first reaction block 92, a second reaction block 94, and a pair of bumpers 96 (FIG. 2).

Figure 6:
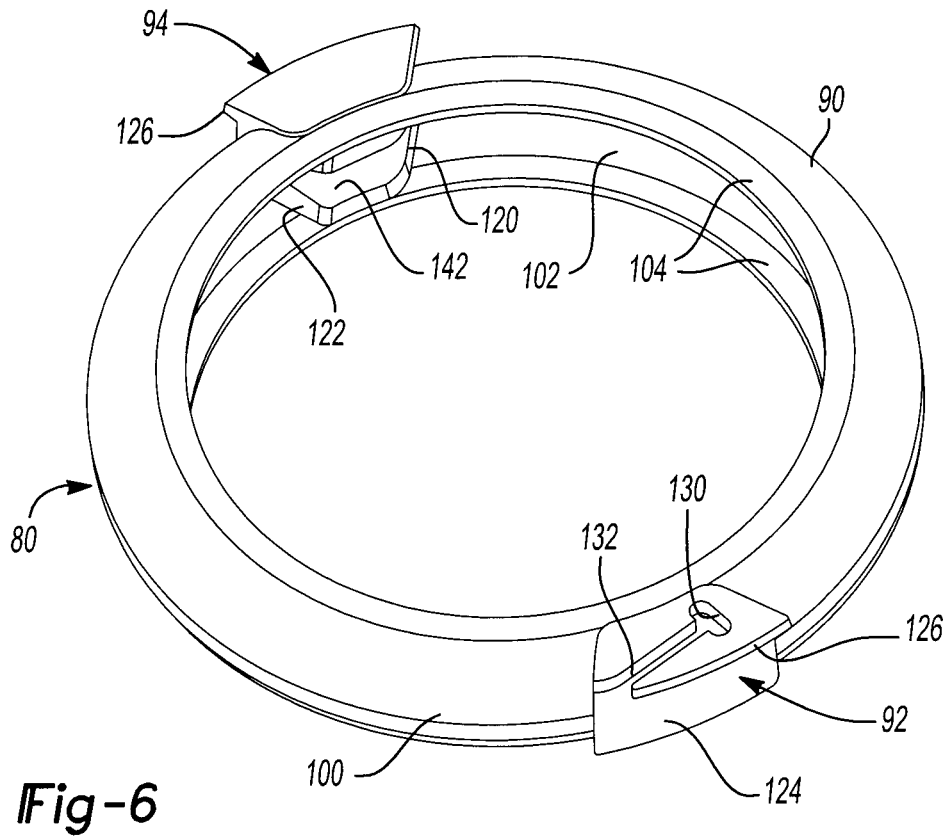
FIGS. 6 and 7 are perspective views of a portion of the isolator of FIG. 4 illustrating the carrier in more detail.
Figure 7:
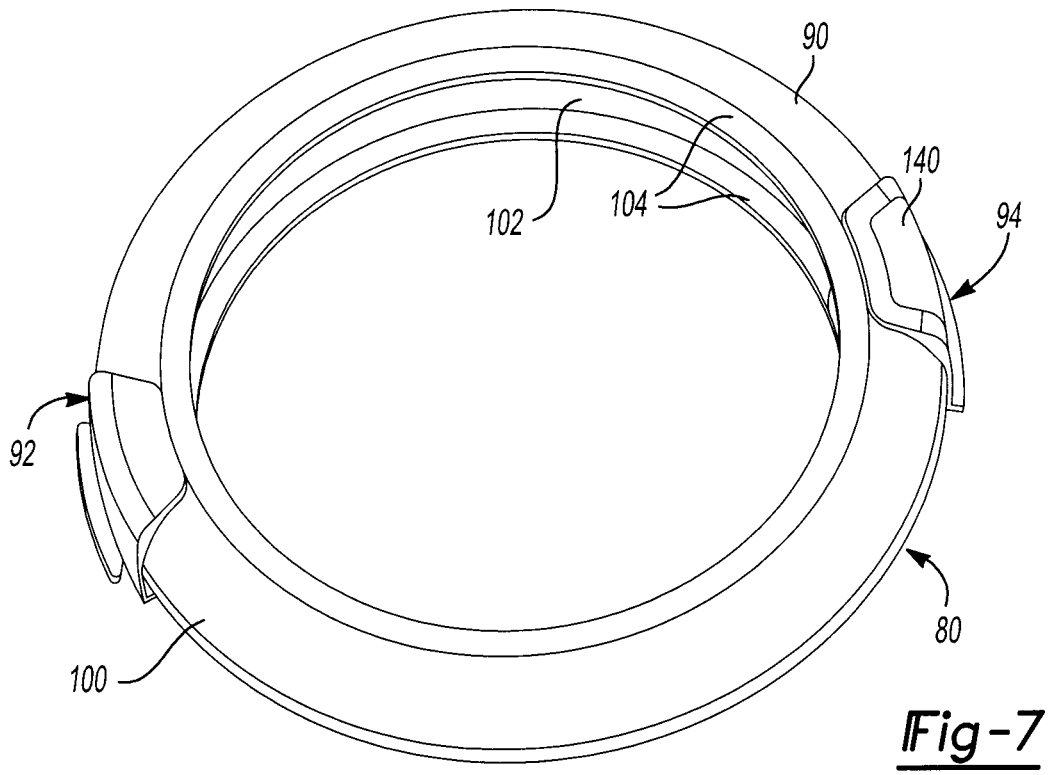

With reference to FIGS. 2, 6 and 7, the carrier member 90 can be formed from metal and can have a generally toric exterior surface 100, a generally toric interior surface 102, and a pair of annular walls 104 disposed on opposite axial sides of the carrier member 90. A pair of block mounting apertures 110 (FIG. 2) can be formed in the carrier member 90 that can be sized to receive the first and second reaction blocks 92 and 94, respectively, in a radial direction (i.e., the first and second reaction blocks 92 and 94 are installed to the carrier member 90 through the block mounting apertures 110 in a radially inward direction). The carrier member 90 can be formed of a mild steel sheet metal in an appropriate manner, such as a spinning operation, and the mounting apertures 110 can be formed in a desired manner (e.g., via punching or shearing). If desired, the carrier member 90 can be heat treated and/or coated with a wear-resistant coating or finish. In the particular example provided, the carrier member 90 is heat treated and nitrided, but it will be appreciated that a lubricious coating or material could be applied to all or a portion of the carrier member 90, such as one the generally toric interior surface 102. Examples of suitable coatings include nickel plating and polytetrafluoroethylene (e.g., Teflon®) and examples of suitable materials include nylon. In instances where a grease or an oil are employed to lubricate the generally toric interior surface 102, various apertures (not shown) could be formed through the carrier member 90 to facilitate the flow of lubricant into the interior of the carrier member 90.

While the carrier member 90 has been described as being unitarily formed, it will be appreciated that the carrier member 90 could be formed by two or more components. For example, the carrier member 90 could be generally formed by two half shells, which could be fabricated in a progressive die from sheet metal, and that the half shells could be fixedly coupled together in an appropriate process, such as welding (e.g., laser welding, friction welding).

Figure 8:
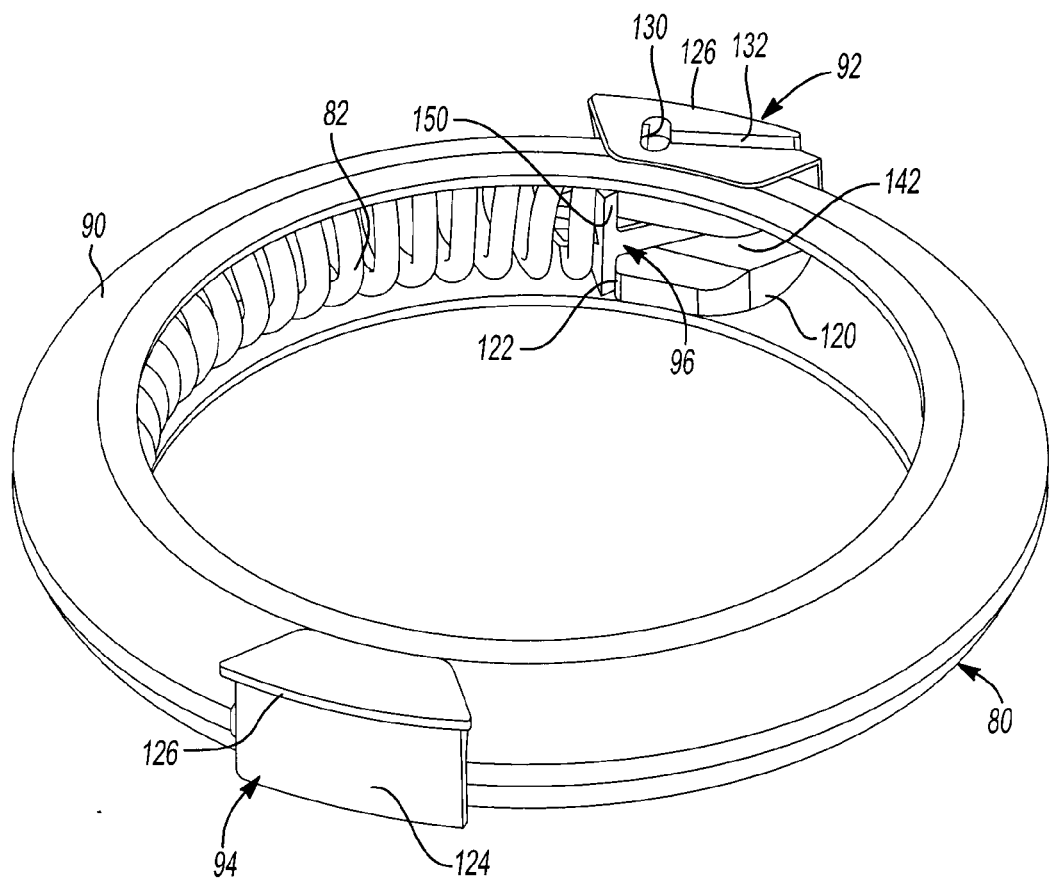
FIG. 8 is a perspective view of a portion of the isolator of FIG. 4.

With reference to FIGS. 3, 6 and 8, the first and second reaction blocks 92 and 94 can be formed of steel and can be received into the block mounting apertures 110 (FIG. 2) and fixedly coupled to the carrier member 90 (e.g., via welding). The first and second reaction blocks 92 and 94 can comprise a first end surface 120 a second end surface 122, which is configured to cooperate with a corresponding one of the bumpers 96 to limit rotational movement of an associated one of the arcuate springs 82 in a second, opposite rotational direction, an outer circumferential support surface 124, and a lip member 126 that extends radially outwardly from the support surface 124. In the example provided, the lip members 126 are disposed on the same side of the carrier 80 (i.e., the front side in the example provided) but it will be appreciated that the lip members 126 may be disposed on opposite axial sides of the carrier 80. The first reaction block 92 can define an abutment surface 130 for engagement with the wrap spring 84. In the example provided, a spring groove 132 is formed into the front surface of the first reaction block 92 and the spring groove 132 terminates at the abutment surface 130. Features can be formed onto/into one or both of the first and second reaction blocks 92 and 94 to aid in rotationally balancing the carrier 80 and/or to reduce the mass of the carrier 80. For example, additional mass may be "added" to a rear side of the first and second reaction blocks 92 and 94 to counteract the mass of the lip member 126, and/or a recess 140 (FIG. 7) or aperture may be formed in the second reaction block 94 to counteract the effect of the spring groove 132 in the first reaction block 92 and/or a circumferential groove 142 can be formed in the first and second reaction blocks 92 and 94 to reduce the mass of the carrier 80.

Figure 9:
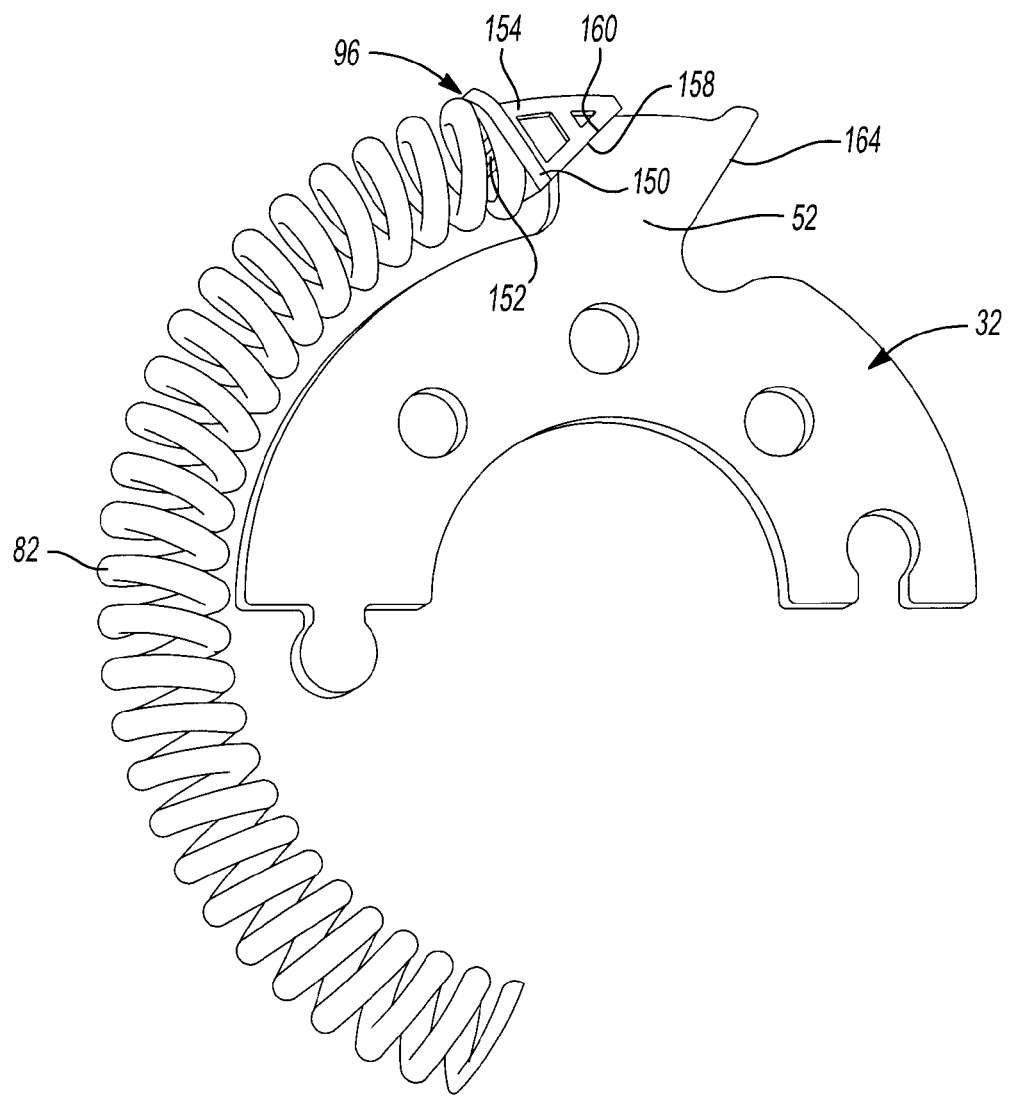
FIG. 9 is a perspective view of a portion of the decoupler of FIG. 1, illustrating the hub, the arcuate springs and the bumper in more detail.

With reference to FIGS. 3, 8 and 9, the bumpers 96 can be configured to aid in maintaining alignment of the arcuate springs 82 along a predetermined plane that extends through the center of the carrier 80 perpendicular to its rotational axis and/or to cushion the hub tabs 52 as rotate with the bias of the arcuate springs 82 against the first and second reaction blocks 92 and 94. The bumpers 96 can comprise a flange member 150, a spring centering portion 152 and a reaction block engagement 154. The flange member 150 can be configured to abut the second end surface 122 on an associated one of the first and second reaction blocks 92 and 94. The spring centering portion 152 can be sized and shaped to engage an associated one of the arcuate springs 82 and position the associated one of the arcuate springs 82 in a desired manner relative to the flange member 150. The reaction block engagement 154 can be configured to align the flange member 150 to the second end surface 122 in a desired manner. In the particular example provided, the reaction block engagements 154 are blade-shaped elements that are received into the circumferential grooves 142 in the first and second reaction blocks 92 and 94 to thereby align the flange members 150 (and thereby the ends of the arcuate springs 82) to the above-referenced plane that extends through the axial center of the carrier 80. Moreover, the reaction block engagements 154 can comprise a tapered abutting surface 158 that is configured to engage a non-driving surface 160 of an associated one of the hub tabs 52 to thereby normally inhibit metal-to-metal contact between the hub 32 and the first and second reaction blocks 92 and 94 when the hub 32 is positioned in a returned position relative to the carrier 36.

With reference to FIGS. 3, 5 and 9, the arcuate springs 82 can be helical coil springs and in the particular example provided, are also compression springs. It will be appreciated that with various modifications to the hub 32 and the carrier 80, the arcuate springs 82 could be tension springs (e.g., the carrier could be formed with a generally U-shaped groove formed into its outer surface for receipt of the arcuate tension springs). A first end of the arcuate springs 82 can be engaged to a driving surface 164 of an associated one of the hub tabs 52, while an opposite end of the arcuate springs 82 can be received over the spring centering portion 152 and abutted against the flange member 150. The arcuate springs 82 can bias the flange members 150 against the second end surfaces 122, and can bias the non-driving surface 160 on the hub tabs 52 toward the first ends surfaces 120 on the first and second reaction blocks 92 and 94 and against the tapered abutting surface 158 of the reaction block engagements 154.

It will be appreciated that the arcuate springs 82 can abut the generally toric interior surface 102 of the carrier member 90 and that if desired, a lubricant, such as an oil (e.g., conventional oil, synthetic oil, traction fluid) or a grease, can be employed to lubricate the generally toric interior surface 102. Additionally or alternatively, a coating or material may be applied to one or both of the generally toric interior surface 102 and the coils of the arcuate springs 82 to reduce friction and wear between the generally toric interior surface 102 and the arcuate springs 82.

With reference to FIGS. 3 and 4, the wrap spring 84 can comprise a proximal end 180, a plurality of helical coils 182 and a free end 184. The wrap spring 84 can be formed of a suitable material, such as a relatively hard spring steel wire, and can have an appropriate cross-sectional shape, such as a generally square or generally rectangular cross-sectional shape, in which the surfaces of the cross-sectional shape are generally flat or somewhat convex in shape. It will be appreciated, however, that the wire of the wrap spring 84 could have any desired cross-sectional shape, including a round cross-sectional shape. Moreover, the wire could be a "plain" wire, or could be coated with a desired coating (e.g., nickel plating) and/or can be lubricated with a desired lubricant, such as an oil (including conventional oils, synthetic oils and traction fluids) or a grease. The proximal end 180 can be shaped in a manner that is complementary to the shape of the spring groove 132 in the first reaction block 92. The proximal end 180 can terminate at an end face 188, which can be generally perpendicular to the longitudinal axis of the wire that forms the wrap spring 84. The proximal end 180 can be received into the spring groove 132 such that the end face 188 abuts the abutment surface 130 in the first reaction block 92. For example, the proximal end 180 can be press-fit into the spring groove 132. In the particular example provided, the abutment surface 130 is flat so as to contact the end face 188 over its entirety, but those of skill in the art will appreciate that the abutment surface 130 and/or the end face 188 may be constructed differently. The helical coils 182 can extend about the diameter carrier 80 such that the inside surface of the helical coils 182 can cooperate with the support surfaces 124 (FIGS. 6 & 8) to roughly center the carrier 80 relative to the wrap spring 84. Moreover, the lip members 126 can abut an axial end of the wrap spring 84 such that the wrap spring 84 is positioned axially relative to the carrier 80 in a desired manner (e.g., such that the carrier 80 is centered along the length of the wrap spring 84). The helical coils 182 can be sized larger in diameter than the carrier member 90 (i.e., such that the helical coils 182 do not directly contact the carrier member 90), and somewhat larger in diameter than the clutch surface 60 on the drive member 34 to thereby engage the clutch surface 60 with an interference fit.

Figure 10:
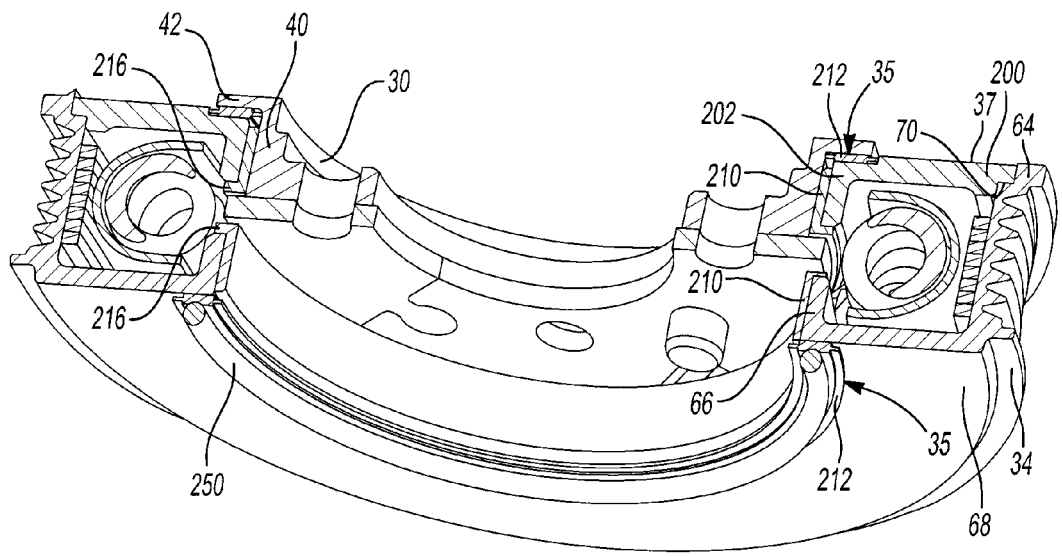
FIG. 10 is a section view of a portion of the decoupler of FIG. 1.

With reference to FIGS. 2, 3 and 10, the cover 37 can include a flat and annular cover member 200 and an annular inner wall 202 that can extend forwardly from the cover member 200. The cover 37 can be received into the counterbore 70 in the rear side of the drive member 34 and can be fixedly coupled to the drive member 34 in any desired manner. For example, the cover 37 can be laser welded to the drive member 34 or a portion of the outer wall 64 can be roll crimped over the cover 37.

With reference to FIGS. 3 and 10, the bushings 35 can include an annular body portion 210 and a circumferentially extending flange member 212 that can extend radially outwardly from the body portion 210. The bushings 35 can be solid or may be split. A first one of the bushings 35 (i.e., the front bushing) can be assembled to the drive member 34 such that the body portion 210 is received into the inner wall 66 and the flange member 212 is abutted against the front side of the front wall 68, while the second one of the bushings 35 (i.e., the rear bushing) can be assembled to the cover member 200 such that the body portion 210 is received into the annular inner wall 202 and the flange member 212 is abutted against the rear surface of the cover member 200. The annular spacer body 40 of the hub spacer 30 can be received through the cover 37 such that flange member 212 of the rear bushing 35 is abutted against the front side of the annular spacer flange 42 and the rear side of the cover 37. It will be appreciated that the body portion 210 of the rear bushing 35 facilitates rotation of the cover 37 relative to the hub spacer 30. If desired, locking tabs 216 may be formed onto an axial end of the body portion 210 opposite the flange member 212; the locking tabs 216 can be employed to axially retain the bushings 35 to the cover 37 and the drive member 34. It will be appreciated that in the particular example illustrated, the sealing of the cover 37 (FIG. 2) to the drive member 34 (FIG. 2), the configuration of the inner wall 66 (FIG. 2), the configuration of the inner wall 202 (FIG. 2) and the configuration of the bearings 35 cooperate to form a labyrinth system and as such, the example is well suited to lubrication of the isolator 36 via a non-liquid lubricant, such as a grease. It should be appreciated that more robust sealing systems may be appropriate in other circumstances, as to provide further protection against infiltration of fine dust and/or moisture, and/or when a liquid lubricant is employed.

Figure 11:
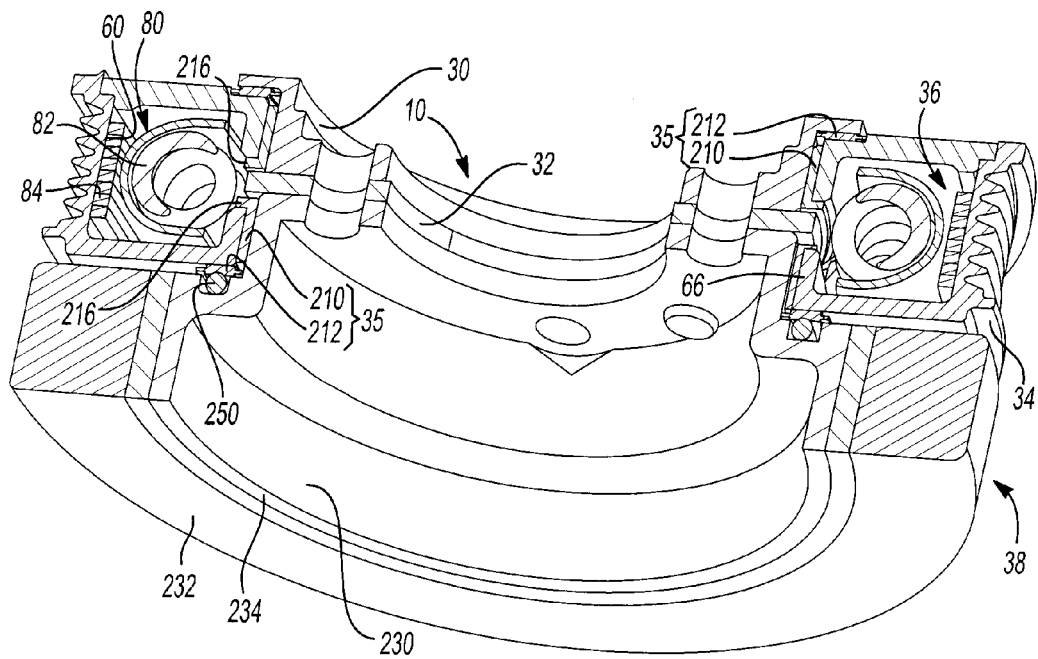
FIG. 11 is a section view of the decoupler of FIG. 1.

With reference to FIGS. 2 and 11, the torsional vibration damper 38 can include a damper hub 230, an inertia member 232 and a torsionally resilient coupling 234, such as an elastomer, that can couple the damper hub 230 to the inertia member 232. The damper hub 230 can be received into the annular inner wall 66 of the drive member 34 and one or more threaded fasteners (not specifically shown) can be employed to fixedly couple the damper hub 230, the hub 32 and the hub spacer 30 to the crankshaft 18 (FIG. 2) for rotation therewith. The body portion 210 of the front bushing 35 can support the drive member 34 for rotation on the damper hub 230, while the flange member 212 can be employed to distribute thrust loads transmitted from the drive member 34 to the damper hub 230. Additionally, a preload member 250 may be employed to take up endplay between the drive member 34 and the hub spacer 30 and/or the damper hub 230. In the particular example provided, the preload member 250 is an annular element that is formed of an elastomer and disposed axially between the front wall 68 of the drive member 34 and the damper hub 230 so as to also form a seal between the damper hub 230 and the front wall 68 of the drive member 34.

With renewed reference to FIGS. 1 and 11, the engine 12 converts the reciprocating motion of the engine's pistons (not shown) into rotary motion that is output via the crankshaft 18. The rotary motion of the crankshaft 18 is not smooth and continuous but rather oscillates even when the rotational speed of the crankshaft 18 is said to be constant. Moreover, undesirable torsional vibration is known to be produced by an engine when it operates. Such torsional vibration is related to the design/configuration of the engine 12 and typically drives the engine 12 into resonance as the crankshaft 18 is accelerated to a speed that exceeds an engine idle speed.

The torsional vibration damper 38 is configured to attenuate the torsional vibration at the resonant frequency of the crankshaft. It should be appreciated that because the damper hub 230 is coupled for rotation with the crankshaft 18 (i.e., through the hub 32 and the hub spacer 30 in the example provided), the torsional vibration damper 38 can be employed to attenuate the torsional vibration produced by the engine at a particular frequency regardless of the operation of the isolator 36 of the decoupler 10.

Since the hub 32 is also driven by (i.e., rotates with) the crankshaft 18, the hub 32 will rotate in the first rotational direction such that rotary power is transmitted to the carrier 80 through the arcuate springs 82. It will be appreciated from the above discussion that: a) the arcuate springs 82 will increasingly deform (e.g., compress in the example provided) as the magnitude of the rotary load transmitted between the hub 32 and the carrier 80 increases; and b) the arcuate springs 82 provide a modicum of resilience in the transmission of rotary power between the hub 32 and the carrier 80, which can aid in attenuating speed fluctuations associated with accelerating/decelerating the accessory drive 14, as well as permit the isolator 36 to operate when the crankshaft 18 decelerates relative to the drive member 34 in a predetermined manner.

Movement of the carrier 80 in the first rotational direction (in response to the transmission of rotary power from the hub 32 through the arcuate springs 82) can cause the wrap spring 84 to tend to uncoil such that the wrap spring 84 drivingly engages the clutch surface 60 so that the drive member 34 rotates with the carrier 80 (and therefore the drive member 34 transmits rotary power to the endless power transmitting element 20 to drive the accessory drive 14).

In a situation where a pulley or sprocket for driving the endless power transmitting element 20 was fixedly coupled to the crankshaft 18 for rotation therewith, oscillation of the rotational speed of the crankshaft 18 during operation of the engine 12 would cause oscillation of the speed of the endless power transmitting element 20 and the speed oscillations would be transmitted from the endless power transmitting element 20 to the several driven accessories 16. One or more of the accessories 16 may, however, have a rotational inertia that is sufficiently high so as not to be capable of accelerating or decelerating in an instantaneous manner that follows the acceleration or deceleration of the crankshaft 18.

Where the crankshaft 18 accelerates at a faster rate than the accessory drive 14 is able to accelerate, the arcuate springs 82 can temporarily deform to a greater extent to provide resiliency in the coupling of the carrier 80 to the hub 32 (which permits rotation of the crankshaft 18 in the first rotational direction relative to the carrier 80 and the drive member 34). In this regard, the arcuate springs 82 can store energy that can be released to the carrier 80 over time to permit the drive member 34 to accelerate to the rotational speed of the crankshaft 18.

Where the crankshaft 18 decelerates at a faster rate than the accessory drive 14 is able to decelerate, the arcuate springs 82 can temporarily deform to a lesser extent, which permits relative rotation of the carrier 80 and the drive member 34 in the first rotational direction relative to the crankshaft 18). When the arcuate springs 82 are sufficiently unloaded for a given situation, the drive member 34 can rotate in the first rotational direction relative to the carrier 80, which can cause the wrap spring 84 to coil radially inwardly and disengage the clutch surface 60 to permit the drive member 34 to overspeed the hub 32.

Figure 12:
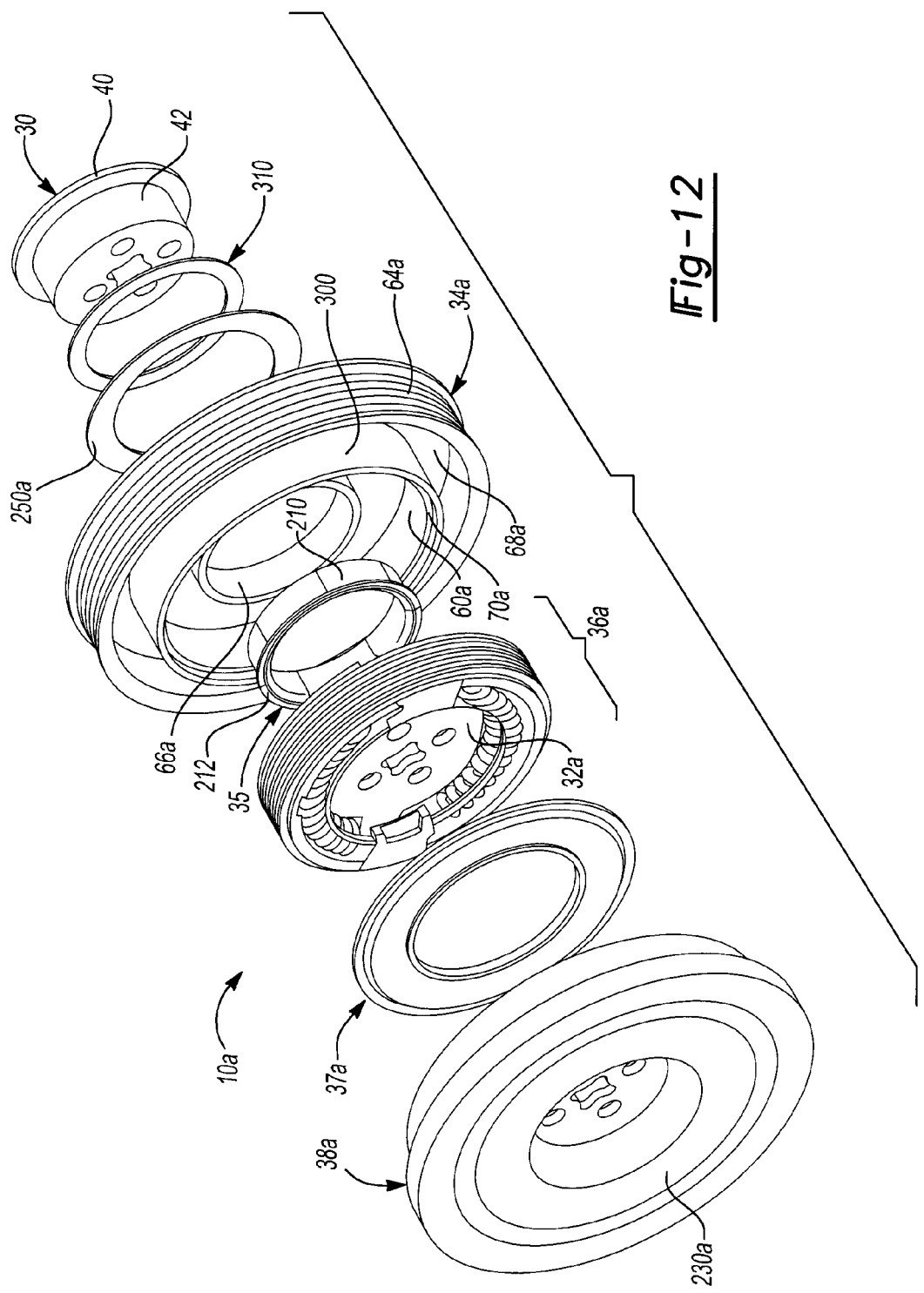
FIG. 12 is an exploded perspective view of another decoupler constructed in accordance with the teachings of the present disclosure.
Figure 13:
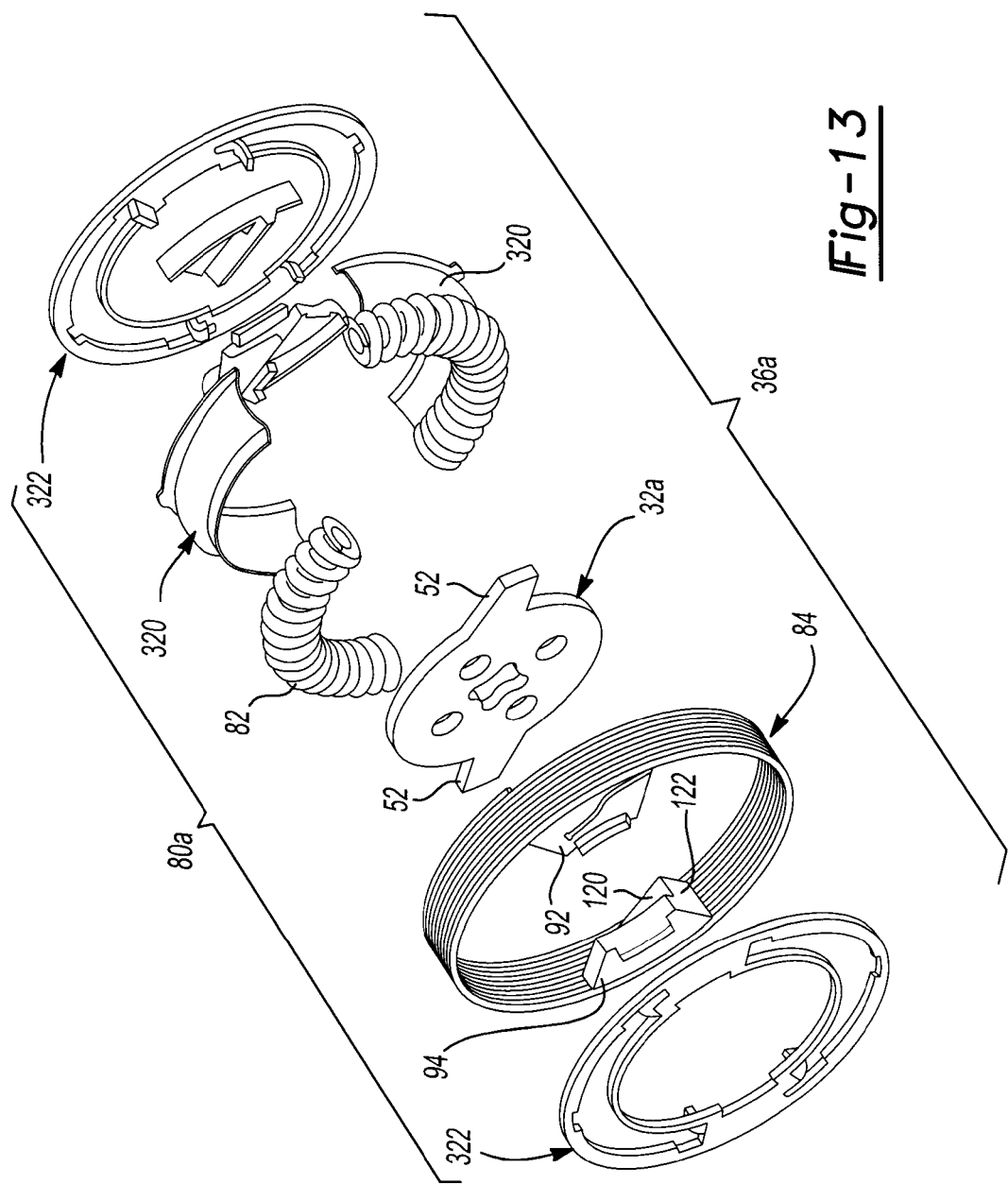
FIGS. 13 and 14 are exploded perspective views of portions of the decoupler of FIG. 12.

With reference to FIGS. 12 and 13, a second decoupler constructed in accordance with the teachings of the present disclosure is generally indicated by reference numeral 10*a*. The decoupler 10*a* can include a hub spacer 30, a hub 32*a*, a drive member 34*a*, an isolator 36*a*, a cover 37*a*, a preload member 250*a*, and a torsional vibration damper 38*a*. The isolator 36*a* can comprise a carrier 80*a*, a plurality of arcuate springs 82, and a wrap spring 84.

The hub 32*a* can be formed of a single piece of sheet steel, but can otherwise be identical to the hub 32 (FIG. 2) described in detail above.

The drive member 34*a* can include a rear wall 68*a*, an outer wall 64*a*, an inner wall 66*a* and an intermediate wall 300 that is disposed between the outer and inner walls 64*a* and 66*a*. The clutch surface 60*a* can be formed on an inside surface of the intermediate wall 300. The counterbore 70*a* can be formed into the intermediate wall 300 on a side opposite the rear wall 68*a*. The rear bushing 35 can be received into the inner wall 66*a* such that the body portion 210 supports the drive member 34*a* for rotation on the hub spacer 30. The flange member 212 can be disposed between an axial end of the inner wall 66*a* and the hub 32*a* to limit axial movement of the drive member 34a in an axial direction opposite the hub spacer 30. A thrust washer 310 and the preload member 250a may be disposed between the annular spacer flange 42 and the rear surface of the rear wall 68a.

Figure 12A:
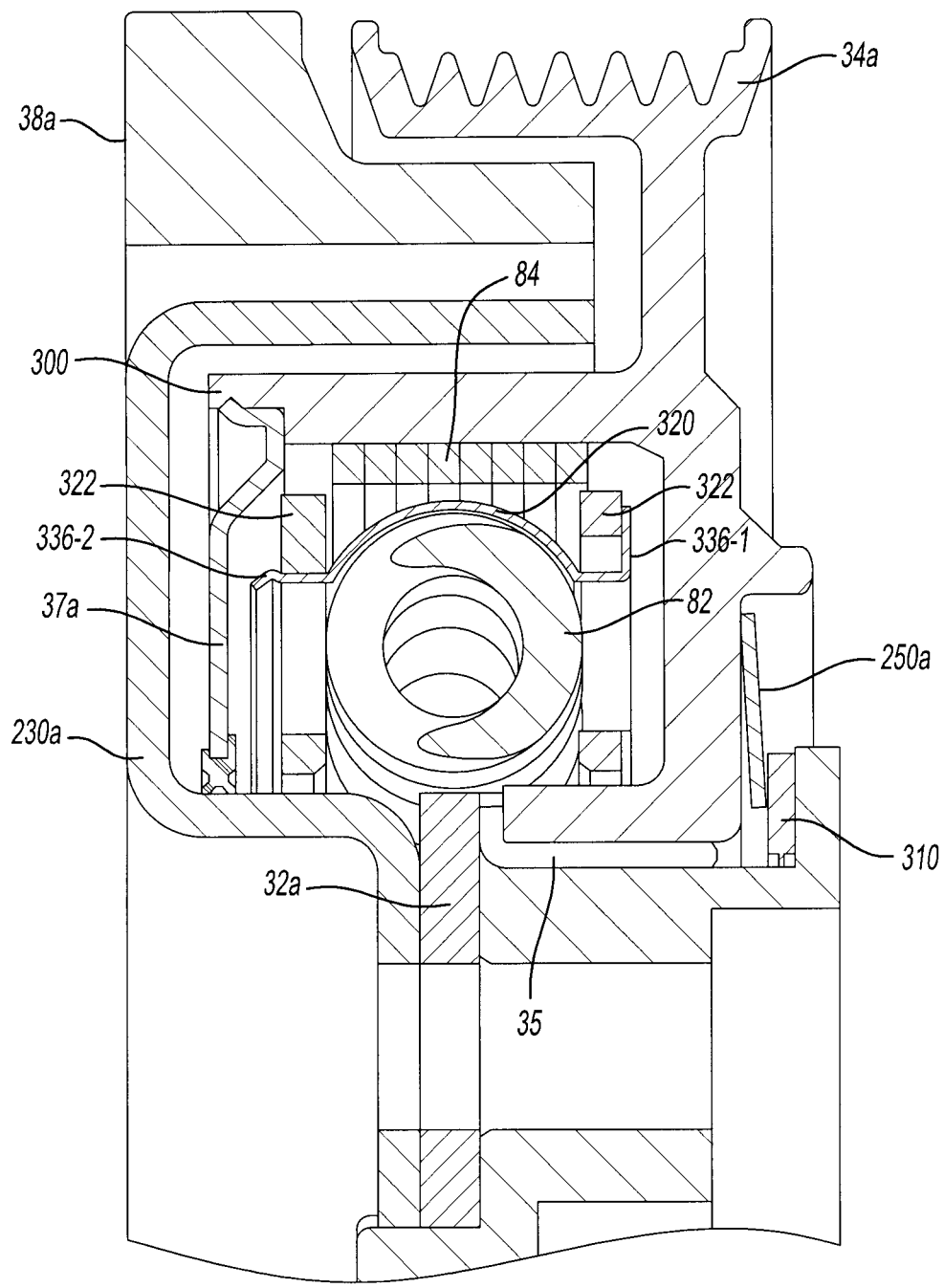
FIG. 12A is a section view of a portion of the decoupler of FIG. 12.
Figure 14:
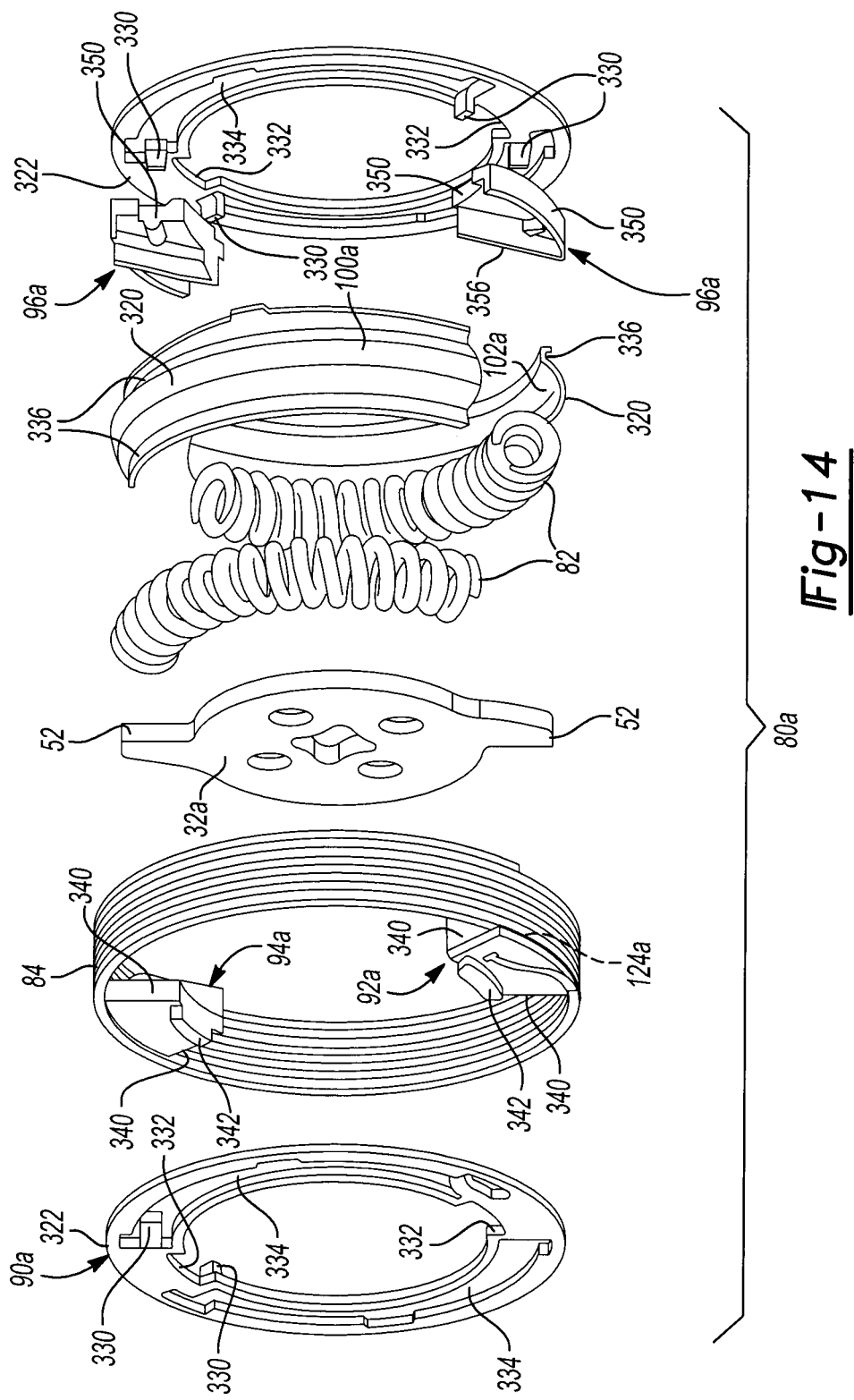

With reference to FIG. 14, the carrier 80a can comprise a carrier member 90a, first and second reaction blocks 92a and 94a and a pair of bumpers 96a. The carrier member 90a can be a fabrication that can comprise a pair of spring guides 320, and a pair of end plates 322 that can be disposed on opposite axial sides of the spring guides 320. Each spring guide 320 can be formed of a sheet steel and hardened/coated as desired. In the particular example provided, the spring guides 320 are formed via roll forming to match the exterior contour of the arcuate springs 82 and are thereafter hardened and nitrided. Accordingly, it will be appreciated that the carrier 80a has a generally toric exterior surface 100a and a generally toric interior surface 102a. Each end plate 322 can define a plurality of keying features that can aid in the location and/or mounting of the spring guides 320 and the first and second reaction blocks 92a and 94a to the end plates 322. In the example provided, the keying features comprise two pair of angled mounting tabs 330 and two tab recesses 332, and a pair of tab slots 334, which are configured to receive corresponding lips or tabs 336 formed on the spring guides 320 to thereby align the spring guides 320 to the end plates 322. As best shown in FIG. 12a, a first one of the tabs 336-1 on the spring guides 320 can be generally L-shaped and can abut an outer axial side of a first one of the end plates 322, while a second one of the tabs 336-2 can present a profile that is slightly larger than the tab slots 334 in a second, opposite end plate 322 so as to be resiliently deformable to snap-fit onto the second end plate 322 in a manner that facilitates assembly.

Returning to FIG. 14, the first and second reaction blocks 92a and 94a can be generally similar to the first and second reaction blocks 92 and 94 (FIG. 3) described above, except that they include a pair of angled mount surfaces 340, which are configured to engage a corresponding pair of the angled mounting tabs 330 in an axially forward one of the end plates 322, and a mount tab 342, which is configured to engage a corresponding one of the tab recesses 332 in the forward one of the end plates 322. Accordingly, it will be appreciated that the carrier member 90a includes mounting apertures that are defined by the end plates 322 and at least one set of the angled mounting tabs 340.

The bumpers 96a can likewise include a pair of angled mount surfaces 350, which are configured to engage a corresponding pair of the angled mounting tabs 330 in an axially rearward one of the end plates 322, and a mount tab (not specifically shown, but similar to the mount tab 342), which is configured to engage a corresponding one of the tab recesses 332 in the rearward one of the end plates 322. The bumpers 96a can be configured to provide additional functionality. For example, the bumpers 96a can include a support surface 350 that can be similar to the support surface 124a formed on the first and second reaction blocks 92a and 94a and configured to aid in centering the carrier 80a relative to the wrap spring 84. Additionally or alternatively, each of the bumpers 96a can include a damper 356 that can overlap the first end surface 120 (FIG. 13) on an associated one of first and second reaction blocks 92a and 94a; the damper 356 can reduce noise associated with the abutment of the tabs 52 of the hub 32a against the first and second reaction blocks 92a and 94a. The spring guides 320, the end plates 322 and the first and second reaction blocks 92a and 94a can be fixedly coupled to one another in any desired manner, such as welding.

The isolator 36a can be received into the drive member 34a such that the wrap spring 84 is engaged to the clutch surface 60a in a manner that is similar to that which is described above. The cover 37a can be coupled to the drive member 34a to enclose the isolator 36a therein.

The torsional vibration damper 38a can be configured to abut the cover 37a and optionally a bearing (not shown) can be employed between the torsional vibration damper 38a and the outer wall 64a to support the drive member 34a for rotation on the torsional vibration damper 38a. For example, the damper hub 230a could include an axially rearwardly projecting portion (not shown) that could be configured to fit axially between the outer wall 64a and the intermediate wall 300 and the bearing could be disposed on axially rearwardly projecting portion of the damper hub 230a.

Figure 15:
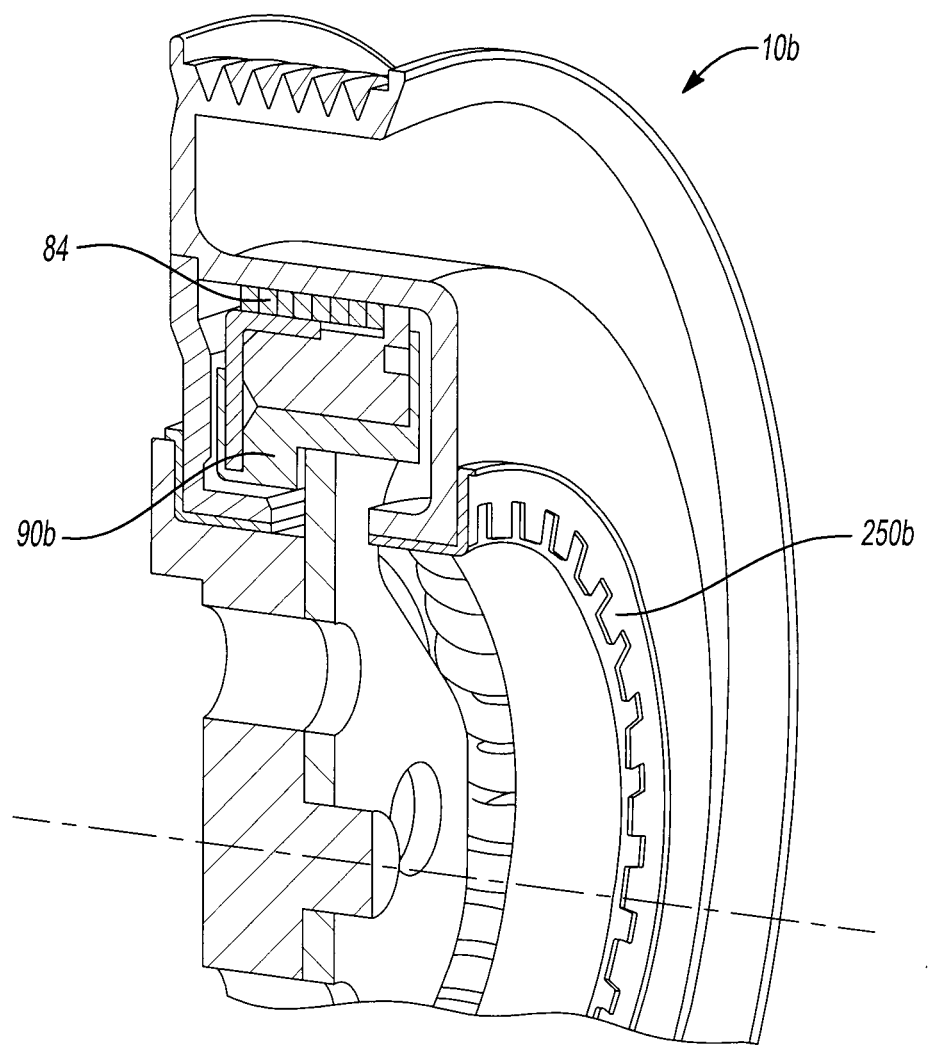
FIG. 15 is a section view of a portion of another decoupler constructed in accordance with the teachings of the present disclosure.

Another decoupler constructed in accordance with the teachings of the present disclosure is illustrated in FIG. 15 and is generally indicated by reference numeral 10b. The decoupler 10b can be generally similar to the decoupler 10 (FIG. 2) except as noted herein.

Figure 16:
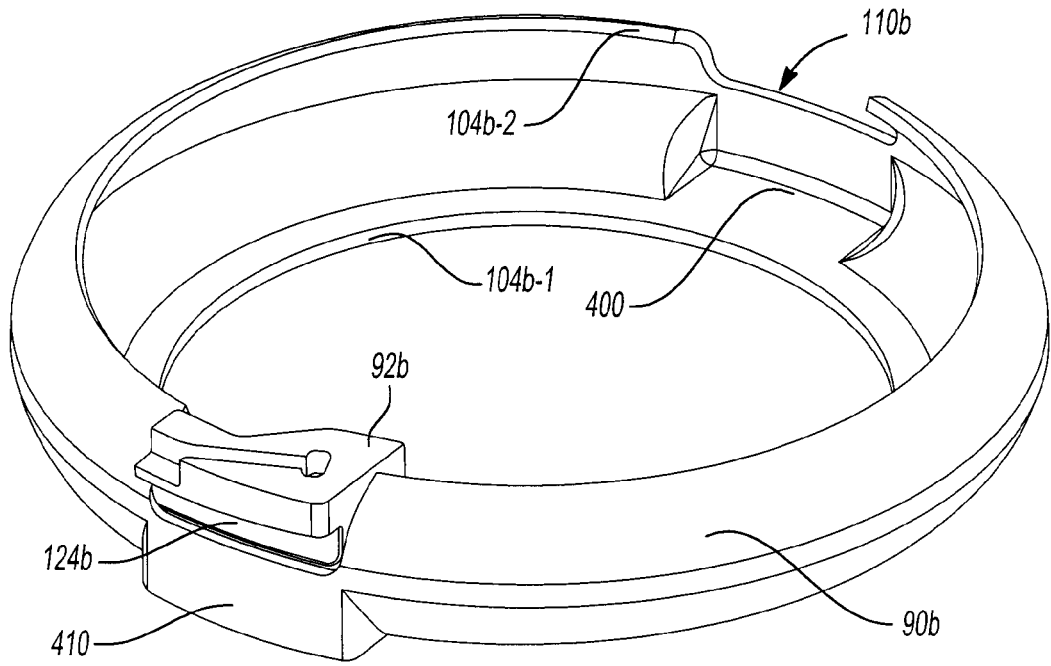
FIGS. 16 and 17 are perspective views of a portion of the decoupler of FIG. 15, illustrating a portion of the carrier in more detail.
Figure 17:
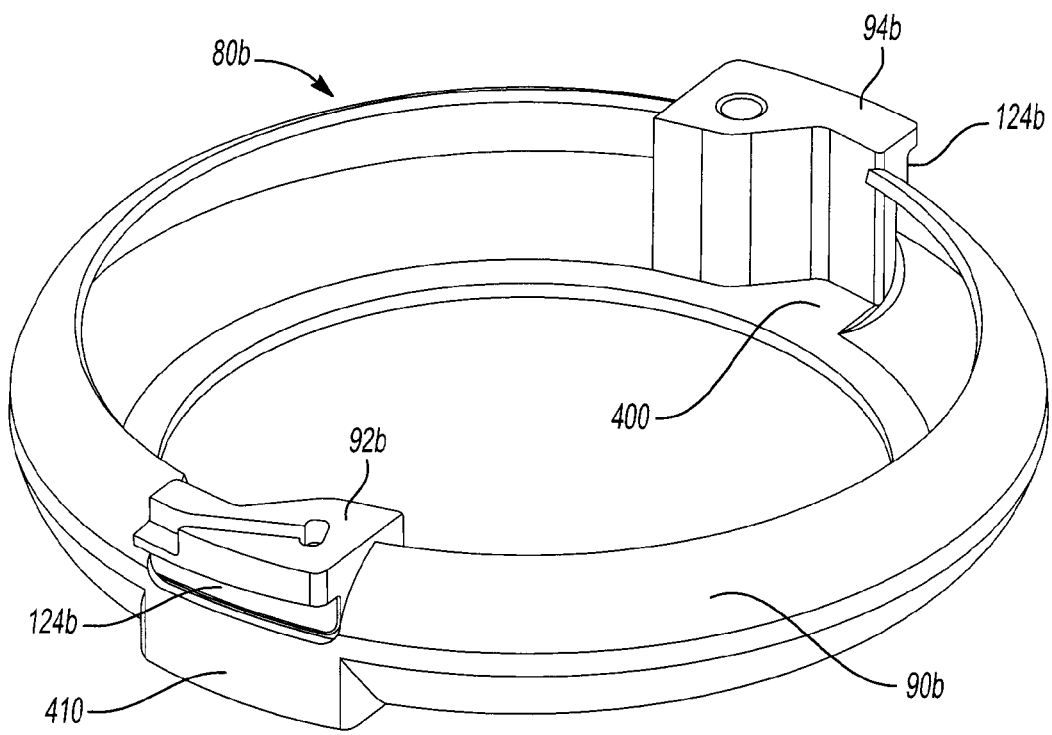

With reference to FIGS. 16 and 17, the block mounting apertures 110b can be formed in the carrier member 90b so as to permit the first and second reaction blocks 92b and 94b to be assembled into the carrier member 90b in an axial direction, rather than in a radially inward direction. The carrier member 90b can be configured with pockets 400 that are contoured retain the first and second reaction blocks 92b and 94b in a circumferential direction. An exterior circumferential surface 410 of the portion of the carrier member 90 associated with the pockets 400 can be configured to cooperate with the support surfaces 124b on the first and second reaction blocks 92b and 94b to roughly center the carrier 80b relative to the wrap spring 84 (FIG. 15). The carrier member 90b can be constructed such that one axial side 104b-1 extends radially inwardly to a larger extent than the opposite axial side 104b-2. In the particular example provided, the side of the carrier member 90b opposite the side in which the block mounting apertures 110b are formed extends radially inwardly to a larger extent. It will be appreciated that the first and second reaction blocks 92b and 94b can abut the inside axial surface of the side 104b-1 of the carrier member 90b.

Figure 18:
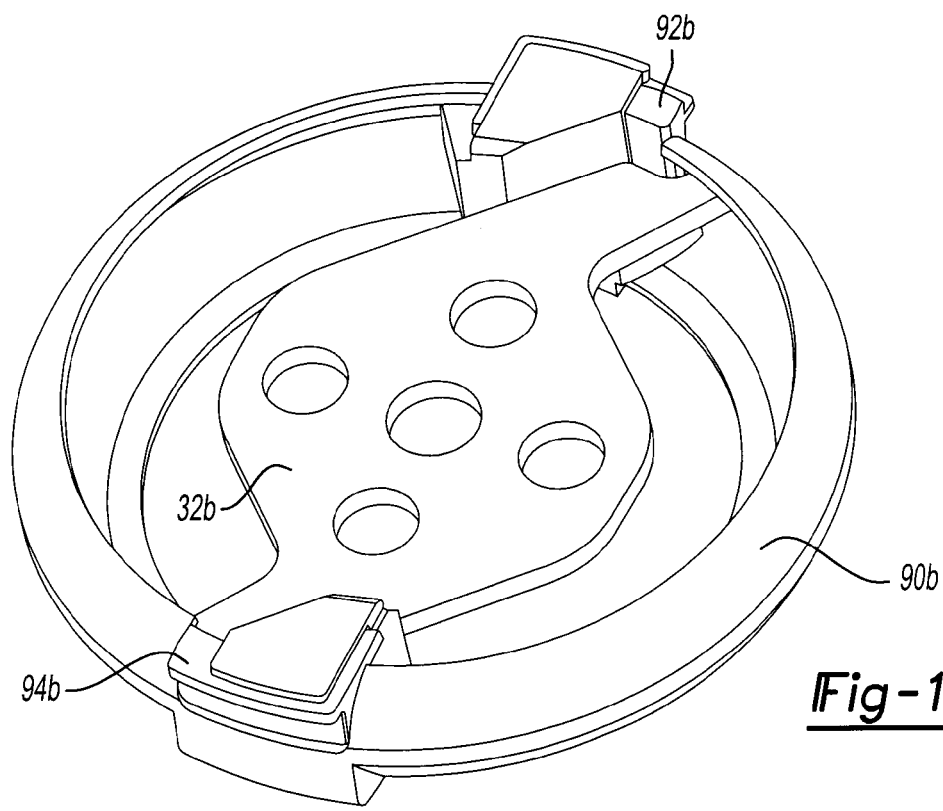
FIG. 18 is a perspective view of a portion of the decoupler of FIG. 15, illustrating the carrier and the hub in more detail.
Figure 19:
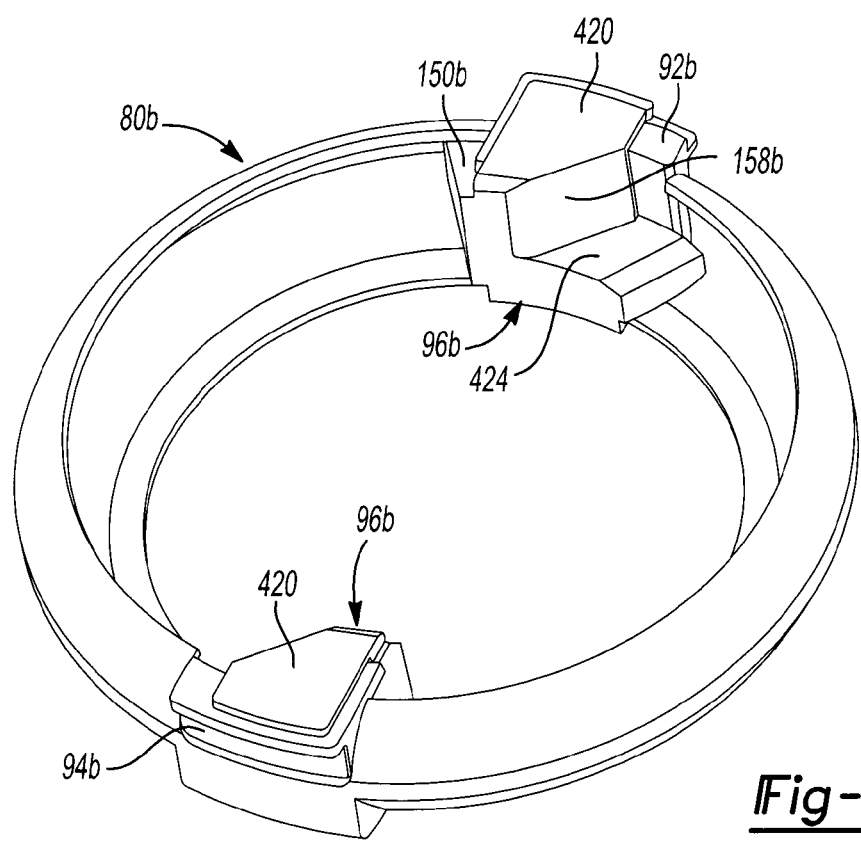
FIG. 19 is a perspective view of a portion of the decoupler of FIG. 15, illustrating the carrier in more detail.
Figure 20:
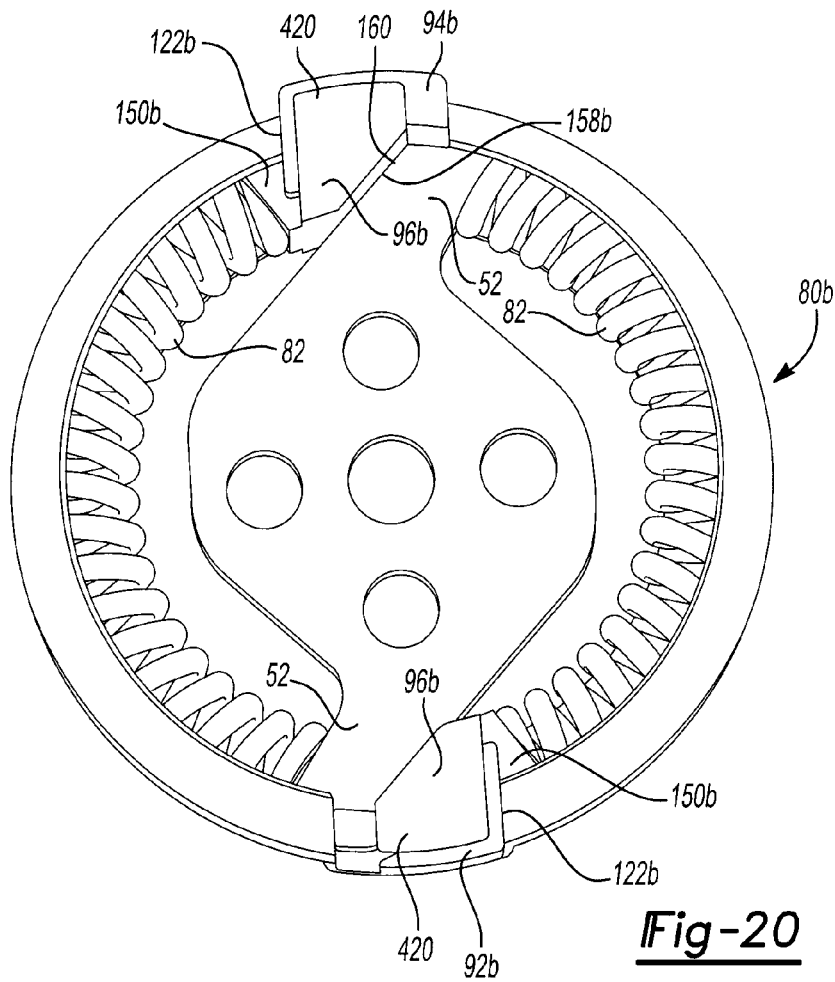
FIG. 20 is a front elevation view of a portion of the decoupler of FIG. 15, illustrating the carrier, the arcuate springs and the hub in more detail.
Figure 21:
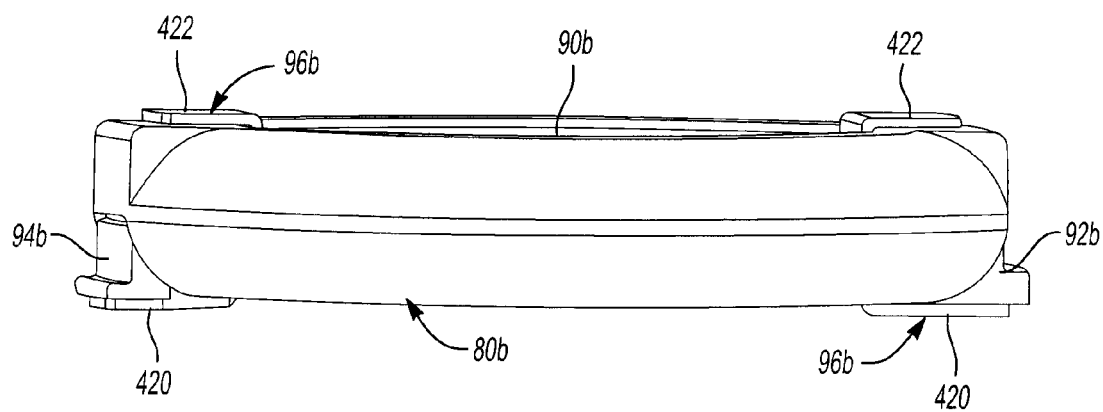
FIG. 21 is a side perspective view of a portion of the decoupler of FIG. 15, illustrating the carrier in more detail.

With reference to FIG. 18, the hub 32b can be unitarily formed from a desired material, such as a mild steel plate, and can be introduced to the interior of the carrier member 90b prior to the installation of the first and second reaction blocks 92b and 94b, which permits the hub 32b, the carrier member 90b and, the first and second reaction blocks 92b and 94b (which can be welded to the carrier member 90b after insertion of the hub 32b to the carrier member 90b) to be processed together through an appropriate heat treating and nitriding process in the example provided so that the hub 32b may be hardened at relatively little additional cost.

With reference to FIGS. 18 through 22, the bumpers 96b are multi-functional components in the particular example provided and are formed of a relatively low friction material, such as nylon. The bumpers 96b can be configured to wrap around the first and second reaction blocks 92b and 94b so as to extend from four sides to thereby permit the bumpers 96b (or portions thereof) to be interposed between a respective one of the first and second reaction blocks 92b and 94b and an associated one of the arcuate springs 82, an associated one of the hub tabs 52, the cover 37 and the front wall 68b so as to prevent metal-to-metal contact in these areas, which can reduce noise and wear. In this regard, the bumpers 96b can comprise a tapered abutting surface 158b that is configured to engage a non-driving surface 160 of an associated one of the hub tabs 52, a spring abutment 150b, which is configured to abut the second end surface 122b on a respective one of the first and second reaction blocks 92b and 94b, a first thrust bearing 420, which can be disposed on a first axial side of the carrier 80b to limit tipping of the carrier 80b relative to the front wall 68b, a second thrust bearing 422, which can be disposed on a second, opposite axial side of the carrier 80b to limit tipping of the carrier 80b relative to the cover 37b, and a third thrust bearing 424, that can be employed to limit axial movement of the carrier 80b relative to the hub 32b. It will be appreciated that the interface between the arcuate springs 82 and the first and second reaction blocks 92b and 94b can be easily molded and that formation of such detail into the first and second reaction blocks 92b and 94b might otherwise be relatively costly and/or difficult. For example, the surface of the spring abutment 150b that is contacted by the arcuate spring 82 need not be parallel to the second end surface 122b.

Figure 22:
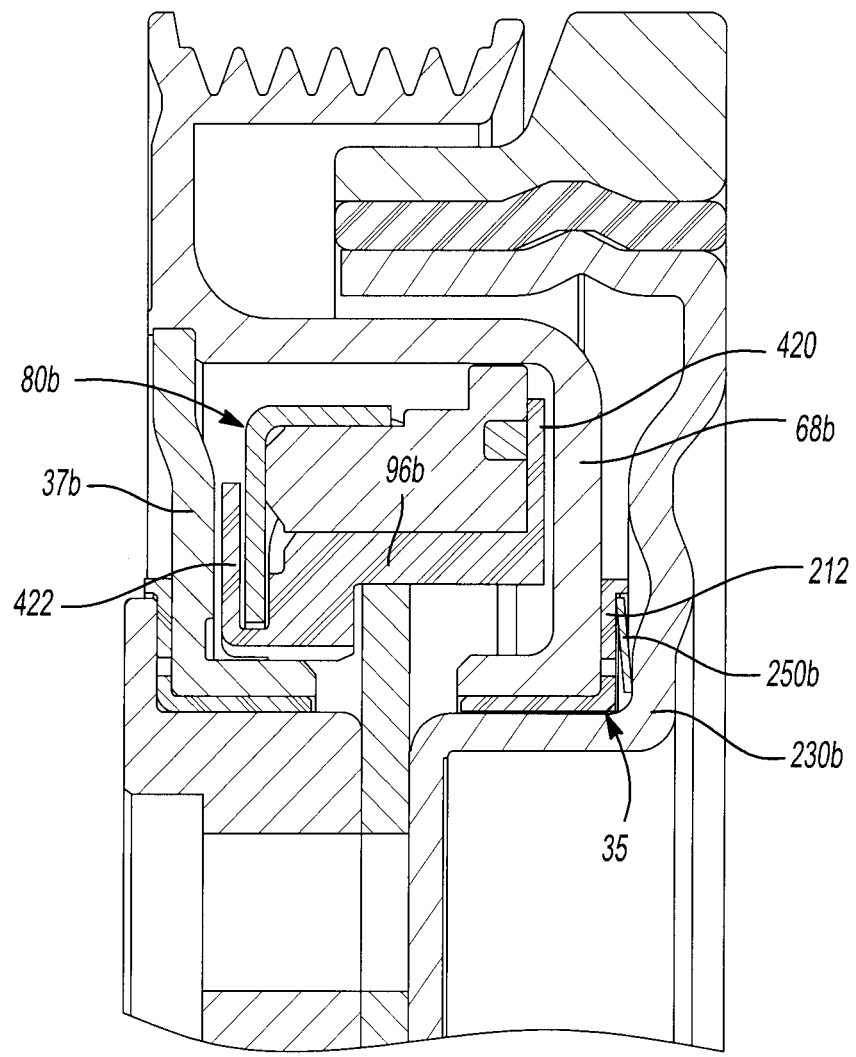
FIG. 22 is a section view of a portion of the decoupler of FIG. 15.

With reference to FIGS. 15 and 22, the preload member 250b can comprise an annular leaf spring or spring washer that can be disposed between the flange member 212 of the front bushing 35 and the damper hub 230b.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. For example, it may be desirable to omit certain components, such as the torsional vibration damper, in some situations. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A decoupler comprising:
an input hub having a rotational axis;
a drive member disposed about the hub for rotation about the rotational axis, the drive member having an inner clutch surface;
an isolator coupling the hub and the drive member, the isolator comprising a carrier, a plurality of arcuate springs, and a wrap spring, the carrier being received between the input hub and the drive member, the carrier comprising a carrier member and a pair of reaction blocks, the carrier member defining a pair of apertures into which the reaction blocks are mounted, each of the arcuate springs being mounted in the carrier member and being disposed between the input hub and an associated one of the reaction blocks, the wrap spring having a proximal end and a plurality of helical coils, the proximal end having an end face that is abutted against one of the reaction blocks, the helical coils being engaged to the inner clutch surface of the drive member;
wherein rotary power is input to the decoupler via the input hub, and wherein rotary power transmitted through the decoupler is transmitted directly from the hub to the arcuate springs.

2. The decoupler according to claim 1, wherein the reaction blocks form at least a portion of an exterior surface of the carrier.

3. The decoupler according to claim 1, wherein the carrier member is unitarily formed.

4. The decoupler according to claim 1, wherein at least a portion of the carrier member has a generally toric exterior surface and a corresponding generally toric interior surface against which the arcuate springs are abutted.

5. The decoupler according to claim 1, wherein the hub is non-removably received in the carrier.

6. The decoupler according to claim 1, wherein the carrier member is formed of metal.

7. The decoupler according to claim 6, wherein the carrier member is formed from sheet metal.

8. The decoupler according to claim 6, wherein the carrier member is hardened via heat treating.

9. The decoupler according to claim 8, wherein the input hub is hardened via heat treating.

10. The decoupler according to claim 9, wherein the input hub is nitrided.

11. The decoupler according to claim 8, wherein the carrier member is nitrided.

12. The decoupler according to claim 1, further comprising a torsional vibration damper having an input member, an inertia member, and a torsionally resilient member that couples the input member and the inertia member, the input member being configured to rotate with the input hub.

13. The decoupler according to claim 12, wherein a resilient preload member is disposed between the input member and the drive member.

14. The decoupler according to claim 13, wherein the resilient preload member comprises a spring washer.

15. The decoupler according to claim 13, wherein the resilient preload member comprises an elastomeric member.

16. The decoupler according to claim 1, wherein a damper is disposed between each of the reaction blocks and the input hub.

17. The decoupler according to claim 16, wherein each damper comprises at least one bumper that extends across an axial side surface of the reaction block.

18. The decoupler according to claim 16, wherein each damper comprises a spring support that is disposed between a corresponding arcuate spring and a corresponding reaction block.

19. The decoupler according to claim 1, wherein each of the reaction blocks comprises an annular rim member that is adjacent an axial end of the wrap spring.

20. The decoupler according to claim 1, wherein the reaction blocks cooperate to center the wrap spring about the carrier.

21. The decoupler according to claim 1, wherein the wrap spring does not directly contact the carrier member.

* * * * *